US005493684A

United States Patent [19]
Gephardt et al.

[11] Patent Number: 5,493,684
[45] Date of Patent: Feb. 20, 1996

[54] POWER MANAGEMENT ARCHITECTURE INCLUDING A POWER MANAGEMENT MESSAGING BUS FOR CONVEYING AN ENCODED ACTIVITY SIGNAL FOR OPTIMAL FLEXIBILITY

[75] Inventors: Douglas D. Gephardt, Austin; James R. MacDonald, Buda; Rita M. O'Brien, Austin, all of Tex.

[73] Assignee: Advanced Micro Devices, Sunnyvale, Calif.

[21] Appl. No.: 223,984

[22] Filed: Apr. 6, 1994

[51] Int. Cl.$^6$ ........................................ G06F 1/32
[52] U.S. Cl. .................... 395/750; 364/707; 364/273.1; 364/273.2; 364/273.3; 364/240; 364/270.2; 364/DIG. 1
[58] Field of Search ..................... 395/750, 775, 395/575; 364/707; 365/226, 227; 307/446, 496, 66; 377/16

[56] References Cited

U.S. PATENT DOCUMENTS

| | | | |
|---|---|---|---|
| 4,698,748 | 10/1987 | Juzswik et al. | 395/750 |
| 4,851,987 | 7/1989 | Day | 395/550 |
| 5,025,387 | 6/1991 | Frane | 364/493 |
| 5,167,024 | 11/1992 | Smith et al. | 395/375 |
| 5,189,647 | 2/1993 | Suzuki et al. | 368/10 |
| 5,237,692 | 8/1993 | Raasch et al. | 395/725 |
| 5,239,652 | 8/1993 | Seibert et al. | 395/750 |
| 5,241,680 | 8/1993 | Cole et al. | 395/750 |
| 5,319,772 | 6/1994 | Hwang | 395/550 |
| 5,390,350 | 2/1995 | Chung et al. | 395/750 |
| 5,396,635 | 3/1995 | Fung | 395/800 |

*Primary Examiner*—Gopal C. Ray
*Attorney, Agent, or Firm*—B. Noel Kivlin

[57] ABSTRACT

An integrated processor is provided that includes a CPU core coupled to a variety of on-chip peripheral devices such as a DMA controller, an interrupt controller, and a timer. The integrated processor further includes a power management message unit coupled to the DMA controller, interrupt controller, and timer for monitoring the internal interrupt and bus request signals of the integrated processor. The power management message unit may also monitor other selected activities of the integrated processor such as activities of a floating-point coprocessing subunit. Based on the detected activities, if any, the power management message unit encodes a message on a power management message bus to thereby provide information regarding the internal events of the integrated processor to an external power management unit. Power management decisions are made by an external power management unit. The power management unit receives the encoded messages on the power management message bus and responsively makes decisions as to the appropriate power management mode to enter. The power management unit includes a clock control unit coupled to an internal clock generator of the integrated processor for controlling the frequencies of a CPU clock signal and a system clock signal. The power management unit further includes a power control unit for controlling the application of power to various external peripheral devices.

17 Claims, 7 Drawing Sheets

POWER MANAGEMENT ARCHITECTURE INCLUDING A POWER MANAGEMENT MESSAGING BUS FOR CONVEYING AN ENCODED ACTIVITY SIGNAL FOR OPTIMAL FLEXIBILITY

BACKGROUND OF THE INVENTION

1. Field of the Invention

This invention relates to computer systems and more particularly to power management architectures employed within computer systems.

2. Description of the Relevant Art

An ongoing developmental goal of manufacturers has been to reduce the power consumption of computer systems. Reducing power consumption typically reduces heat generation of the system, thereby increasing reliability and decreasing cost. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMUs). One specific power reduction technique involves the capability of stopping clock signals that drive inactive circuit portions. A system employing such a technique typically includes a power management unit that detects or predicts inactive circuit portions and accordingly stops the clock signals associated with the inactive circuit portions. By turning off "unused" clock signals that drive inactive circuit portions, overall power consumption of the system is decreased. A similar technique involves the capability of reducing the frequency of clock signals that drive circuit portions during operating modes which are not time critical, and another technique involves the capability of removing power from inactive circuit portions.

Power managed computer systems that employ the above-described power reduction techniques typically monitor various activities at the point of use or by snooping centralized buses. For example, an activity monitor of a power management unit may be connected directly to various control lines associated with the microprocessor and peripheral devices to determine whether certain activities are occurring. Depending upon the detected activities, the power management unit may responsively power down selected circuit portions, reduce the frequencies of selected clock signals and/or completely stop selected clock signals.

In recent years, integrated processors have been developed to replace previously discrete microprocessors and associated peripheral devices within computer systems. An integrated processor is an integrated circuit that performs the functions of both a microprocessor and various peripheral devices such as, for example, a memory controller, a DMA controller, a timer, and a bus interface unit, among other things. The introduction of integrated processors has allowed for decreases in the overall cost, size, and weight of computer systems, and has in many cases accommodated improved performance characteristics of the computer systems.

A problem encountered in the design of computer systems that incorporate integrated processors is that many points of monitoring are no longer available to an external power management unit. That is, since the CPU core and various peripheral devices are contained on a common integrated circuit chip, internal connections between the CPU core and the peripheral devices may not be accessible externally. Thus, certain system activities may be undetectable in real-time. Although external package pins could be provided on the integrated processor to provide external access directly to the selected internal points of monitoring, such dedicated pins would result in a significant increase in the overall pin count of the integrated processor and would further require that the die size of the integrated processor be increased to accommodate the additional bond wire pads. As a result, a significant cost would be added to the cost of the integrated processor.

On the other hand, rather than providing an external power management unit, a power management unit could be incorporated as an integral part of the integrated processor itself. However, this would limit the flexibility available to the system designer in implementing different power management designs using the same processor.

A further problem associated with computer systems including those that incorporate integrated processors involves the determination of how the power management unit should treat each detected activity. Although a variety of systems have been proposed in which the power management unit causes the frequencies of selected clock signals to be raised if certain system activities are detected and to be lowered if the system activities are not detected, such systems typically do not treat the detected activities differently. As a result, the efficiency of these systems may be somewhat limited since many detected activities have different associated impacts upon power consumption than others.

SUMMARY OF THE INVENTION

The problems outlined above are in large part solved by a power management architecture in accordance with the present invention. In one embodiment, an integrated processor is provided that includes a CPU core coupled to a variety of on-chip peripheral devices such as a DMA controller, an interrupt controller, and a timer. The integrated processor further includes a power management message unit coupled to the DMA controller, interrupt controller, and timer for monitoring the internal interrupt and bus request signals of the integrated processor. The power management message unit may also monitor other selected activities of the integrated processor such as activities of a floating-point coprocessing subunit. Based on the detected activities, if any, the power management message unit encodes a message on a power management message bus to thereby provide information regarding the internal events of the integrated processor to an external power management unit.

Power management decisions are made by an external power management unit. The power management unit receives the encoded messages on the power management message bus and responsively makes decisions as to the appropriate power management mode to enter. The power management unit includes a clock control unit coupled to an internal clock generator of the integrated processor for controlling the frequencies of a CPU clock signal and a system clock signal. The power management unit further includes a power control unit for controlling the application of power to various external peripheral devices.

In one embodiment, a power management unit, which may also detect additional system activities by way of, for example, bus snooping, classifies each detected activity as either a primary activity or a secondary activity. The power management unit includes several states, each of which is associated with a different power management mode. Transitions between the states of the power management unit are dependent upon the type of activities detected. Upon reset of the computer system, the power management unit enters a ready state during which the CPU clock signal and the system clock signal are driven at their maximum frequencies. If no primary activities are detected for a predetermined length of time, the power management unit successively transitions from the ready state to a doze state, then to a stand-by state, and then to a suspend state. During the doze state, the frequency of the CPU clock signal is slowed, and during the stand-by state, the CPU clock signal is stopped. During the suspend state, both the CPU clock signal and the system clock signal are stopped, and the power to selected circuit portions may be removed. If a secondary activity is detected when the power management unit is in the doze state or the ready state, the power management unit enters a transitory state during which both the CPU clock signal and the system clock signal are driven at maximum frequencies for a predetermined time duration. Subsequently, the power management unit reverts back to the previous power management state. Primary activities cause the power management unit to enter the ready state, regardless of the current state. The power management unit classifies activities of a floating-point coprocessing unit, parallel port activities, serial port activities, floppy disk activities, and hard disk activities as primary activities. The power management unit classifies system management interrupt (SMI) activities, interrupt activities, and timer activities as secondary activities. Other selected activities may be programmed as either primary or secondary activities. As a result of the power management system, flexibility and optimization of power management may be attained.

Broadly speaking, the present invention contemplates a computer system comprising an integrated processor including a CPU core, a power management message unit coupled to the CPU core, and a clock generator coupled to the CPU core. The power management message unit is capable of detecting an internal activity of the integrated processor and of providing a signal indicative of the internal activity on an external set of terminals. The computer system further comprises a power management message bus coupled to the external set of terminals, and a power management unit coupled to the power management message bus for managing power within the computer system. The power management unit is fabricated on an integrated circuit chip which is separate from the integrated processor and includes a clock control unit capable of controlling the clock generator.

The present invention further contemplates a method for managing power within a computer system, wherein the computer system includes an integrated processor having a CPU core and at least one on-chip peripheral device. The method comprises the steps of detecting an internal activity of the integrated processor, generating an activity signal indicative of the internal activity, and providing the activity signal on an external bus couled to the integrated processor. The method further comprises the steps of receiving the activity signal at an external power management unit, and providing a clock control signal from the external power management unit to the integrated processor to control generation of a CPU clock signal depending upon the activity signal.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
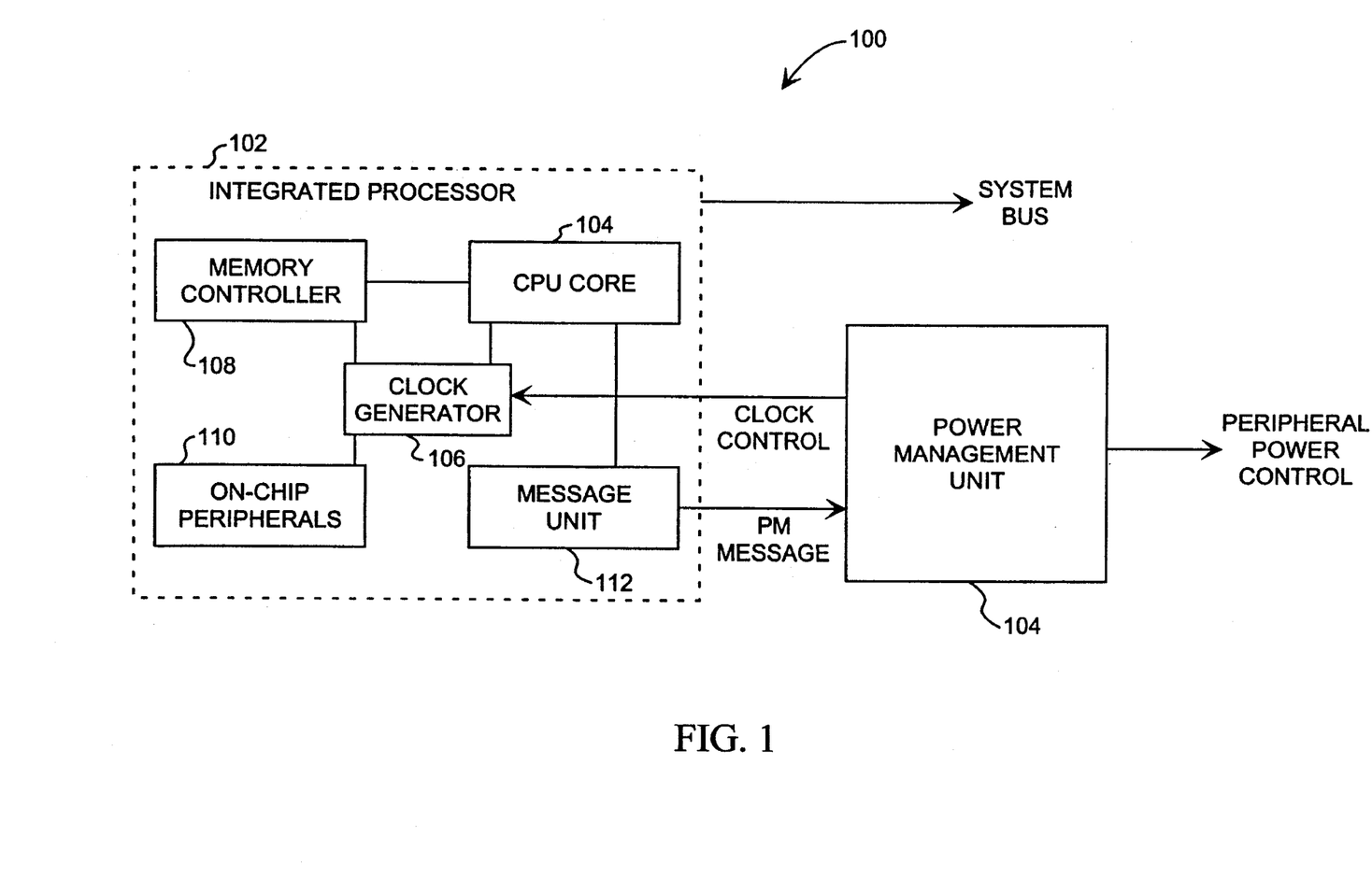
FIG. 1 is a block diagram of a computer system employing a power management architecture in accordance with the present invention.

Referring now to the drawings, FIG. 1 is a block diagram of a computer system 100 including an integrated processor 102 coupled to a power management unit 104. Integrated processor 102 includes a CPU core 104 coupled to a clock generator 106 and to a memory controller 108. Integrated processor 102 further includes a meesage unit 112 and a plurality of on-chip peripherals represented generally by block 110.

Generally speaking, power management unit 104 is provided for managing the power within computer system 100, and is contained on an integrated circuit that is separate from integrated processor 102. Power management unit 104 receives power management (PM) messages from message unit 112 indicative of the operation of integrated processor 102. Using these messages, power management unit 104 generates a set of clock control signals to control the generation of a CPU clock signal and a system clock signal by clock generator 106. Specifically, the clock control signals are capable of causing the CPU and system clock signals to be either slowed or stopped. Power management unit 104 further generates a set of peripheral power control signals that control the application of power to various external peripheral devices. Further details regarding a computer system that conforms to the block diagram of FIG. 1 are provided below.

Figure 2:
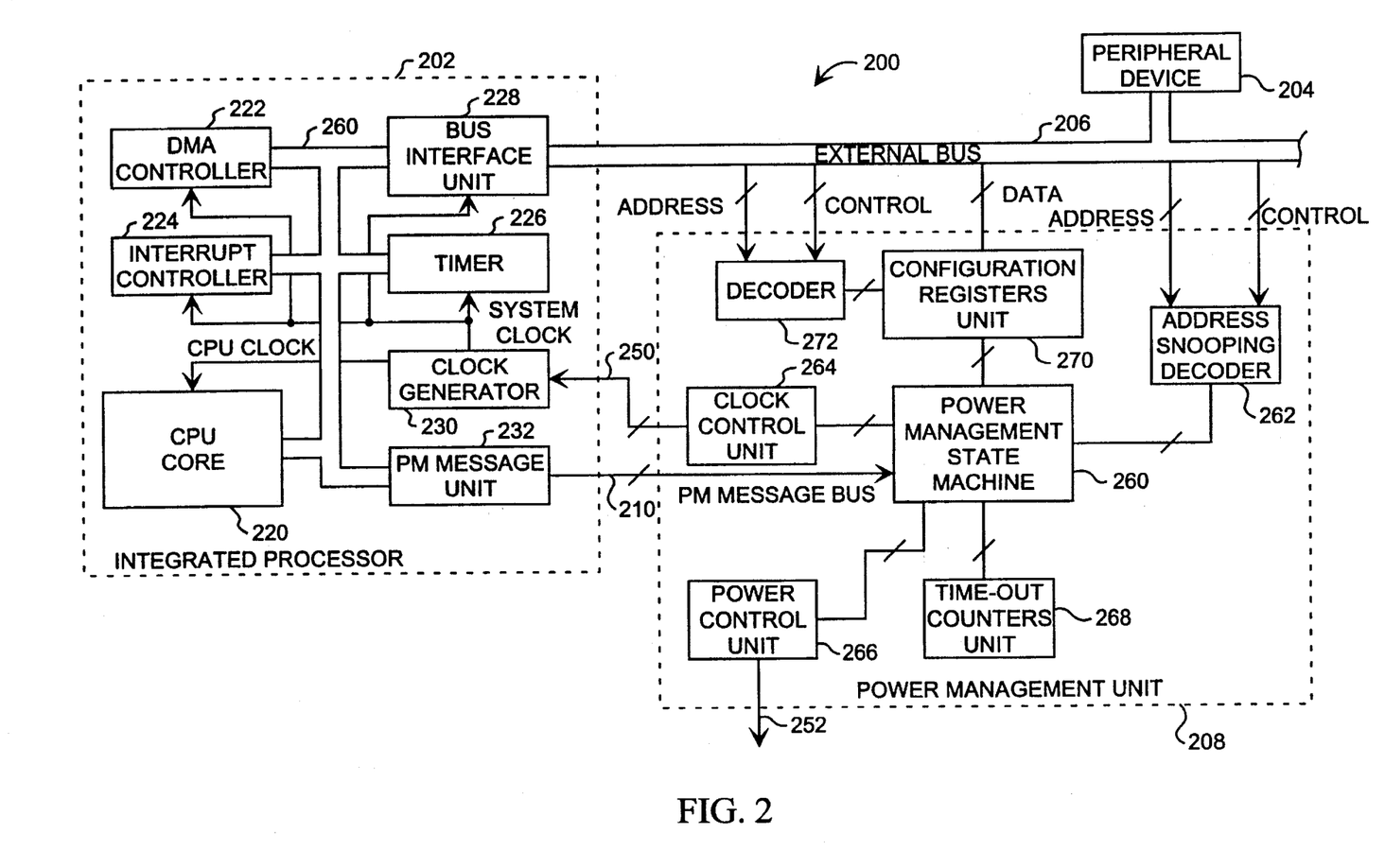
FIG. 2 is a block diagram that illustrates details associated with one implementation of a power management architecture according to the present invention.

Referring now to FIG. 2, a block diagram is shown of a computer system 200 that employs a power management architecture according to the present invention. The computer system 200 includes an integrated processor 202 coupled to a peripheral device 204 via an external bus 206.

Integrated processor 202 is further coupled to a power management unit 208 via a power management message bus 210.

Integrated processor 202 includes a CPU core 220 coupled to a variety of on-chip peripheral devices such as a DMA (direct memory access) controller 222, an interrupt controller 224, and a timer 226. CPU core 220 is coupled to external bus 206 via an on-chip bus interface unit 228. A clock generator 230 and a power management (PM) message unit 232 are further incorporated within integrated processor 202.

External bus 206 is illustrative of, for example, a PCI local bus. It is noted that other bus standards such as the ISA or EISA bus standards could be alternatively employed. Peripheral device 204 is illustrative of any externally connectable peripheral device such as a video controller, a disk drive, or a printer.

Power management unit 208 is provided for managing and minimizing the power consumed by computer system 200. The power management unit 208 receives an encoded signal PMCODE [2:0] on power management message bus 210. The encoded signal PMCODE[2:0] is indicative of certain activities that occur within integrated processor 202, as will be described below. Power management unit 208 generates a set of clock control signals at lines 250 and a set of power control signals at lines 252. The clock control signals and the power control signals are used, respectively, to control the frequencies of selected clock signals and to control the application of power to selected circuit portions. Specifically, the clock control signals are received by clock generator 230 which generates a CPU clock signal and a system clock signal. The frequencies of the CPU clock signal and the system clock signal are dependent upon the clock control signals generated by power management unit 208. The power control signals on lines 252 are provided to control the application of power to selected circuit portions that comprise computer system 200 such as peripheral device 204. It is understood that certain power control signals may be provided to integrated processor 202 to control the application of power to various internal circuit portions of integrated processor 202. Further details regarding power management unit 208 will be provided below.

CPU core 220 is a data processing unit that implements a predetermined instruction set, such as the model 80486 microprocessor instruction set. CPU core 220 further includes a floating point coprocessing subunit. DMA controller 222 is provided for controlling data transfers between a system memory (not shown) and various I/O peripheral devices (also not shown). Interrupt controller 224 is provided for interfacing, prioritizing, and masking various interrupt signals associated with computer system 200. Timer 226 is provided for general purpose timing functions, including the generation of a timer tick interrupt signal. Finally, bus interface unit 228 is provided for orchestrating and controlling the transfer of data, address, and control signals between external bus 206 and an internal bus 260. It is noted that DMA controller 222, interrupt controller 224, timer 226, and bus interface unit 228 may be fabricated in accordance with a variety of known circuit implementations.

Figure 3:
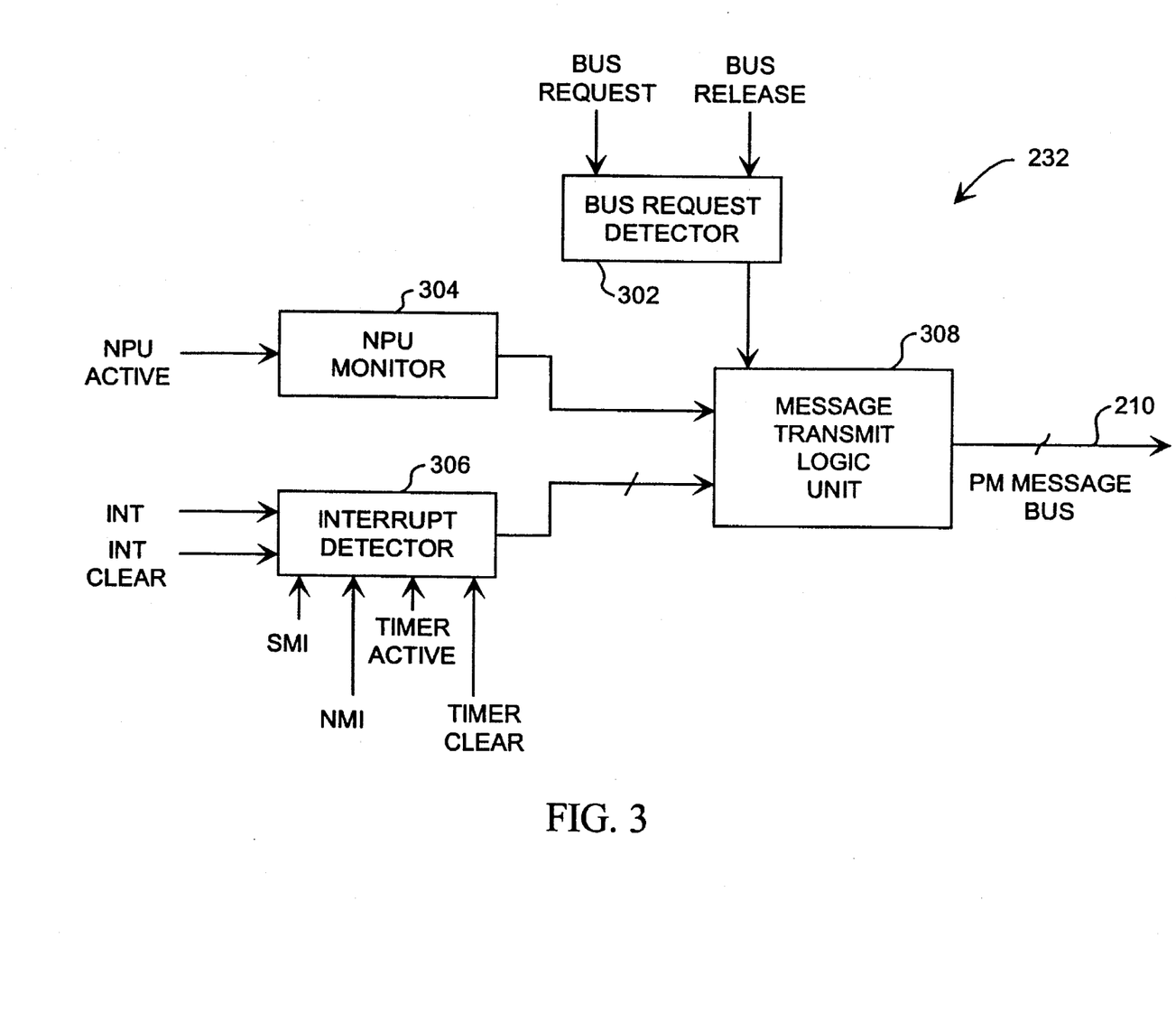
FIG. 3 is a block diagram of a power management message unit incorporated within an integrated processor of FIG. 2.

Referring next to FIG. 3, a block diagram is shown of the power management message unit 232. As illustrated in the figure, the power management message unit 232 includes a bus request detector 302, an NPU monitor 304, and an interrupt detector 306 coupled to a message transmit logic unit 308. The bus request detector 302 is capable of detecting a bus request signal associated with bus 260, and is capable of detecting the subsequent release of the bus 260. It is noted that the bus request signal may be generated by DMA controller 222 or by bus interface unit 228 (which asserts the bus request signal in response to an external bus master). NPU monitor 304 is coupled to CPU core 220 and is capable of detecting when the coprocessing subunit of CPU core 220 is active. Interrupt detector 306 is coupled to interrupt controller 224 and CPU core 220 and is capable of detecting the assertions of an interrupt signal INT, a non-maskable interrupt signal NMI, a system management interrupt signal SMI, and a timer tick interrupt signal. Interrupt detector 306 is further capable of detecting when a corresponding interrupt service and a corresponding timer tick service have cleared.

Depending upon the system activity as detected by bus request detector 302, NPU monitor 304, and interrupt detector 306, message transmit logic unit 308 issues an encoded signal on the power management message bus 210. The encoding of the power management message bus 210 is indicated below in Table I.

TABLE I

| Internal Event | Bit Definition PMCODE [2:0] | Description |
| --- | --- | --- |
| PM Bus NOP | 000 | May be used as a no-operation command. |
| NPU Active | 001 | The start of an NPU instruction has been detected. |
| Bus request | 010 | Either an external bus master or the internal DMA controller is active. |
| NMI occurred | 011 | A non-maskable interrupt was generated to the CPU. |
| SMI Active | 100 | A system management mode interrupt was generated to the CPU. |
| Interrupt Active | 101 | At least one interrupt service routine is in progress, excluding timer interrupts. |
| Timer Active | 110 | A timer interrupt is pending or in service. |
| All Clear | 111 | Indicates that any bus request or interrupt service has completed. |

As indicated in Table I, the power management message bus 210 is driven with a PMCODE [2:0] value of 001 when the start of a co-processor instruction has been detected by NPU monitor 304. The power management message bus 210 is driven with a PMCODE [2:0] value of 010 if either an external bus master or the internal DMA controller 222 is active, as detected by bus request detector 302. A PMCODE [2:0] value of 011 is driven on the power management message bus 210 if a non-maskable interrupt is received by CPU core 220, and a PMCODE [2:0] value of 100 is driven on power management message bus 210 if a system management mode interrupt is received by CPU core 220. A PMCODE [2:0] value of 101 is driven on the power management message bus 210 if at least one interrupt service routine is in progress, excluding timing interrupts, and a PMCODE [2:0] value of 110 is driven on the power management message bus 210 if a timer interrupt is pending or is in service. Finally, a PMCODE [2:0] value of 111 is driven on the power management message bus 210 if any bus request or interrupt service previously indicated has completed.

Figure 4:
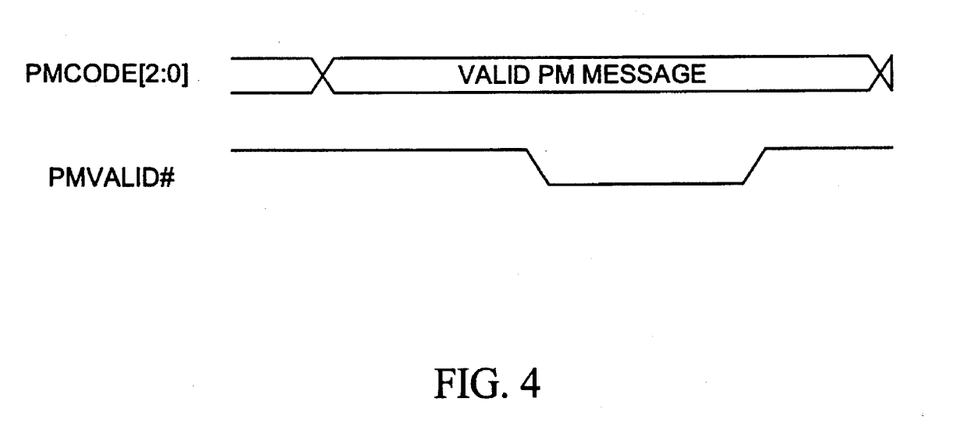
FIG. 4 is a timing diagram that illustrates a message transmit cycle executed by the power management message unit of FIG. 2.

FIG. 4 is a timing diagram that illustrates a message transmit cycle executed by message transmit logic unit 308. As illustrated, when the occurrence of a monitored activity has been detected, or when the completion of a monitored activity has been detected, the PMCODE [2:0] lines of power message bus 210 are driven with a valid encoded message in accordance with values defined in Table I. A validation strobe signal labeled PMVALID# is simultaneously asserted on power management message bus 210 to indicate that a valid message is being driven on lines PMCODE [2:0].

Figure 5:
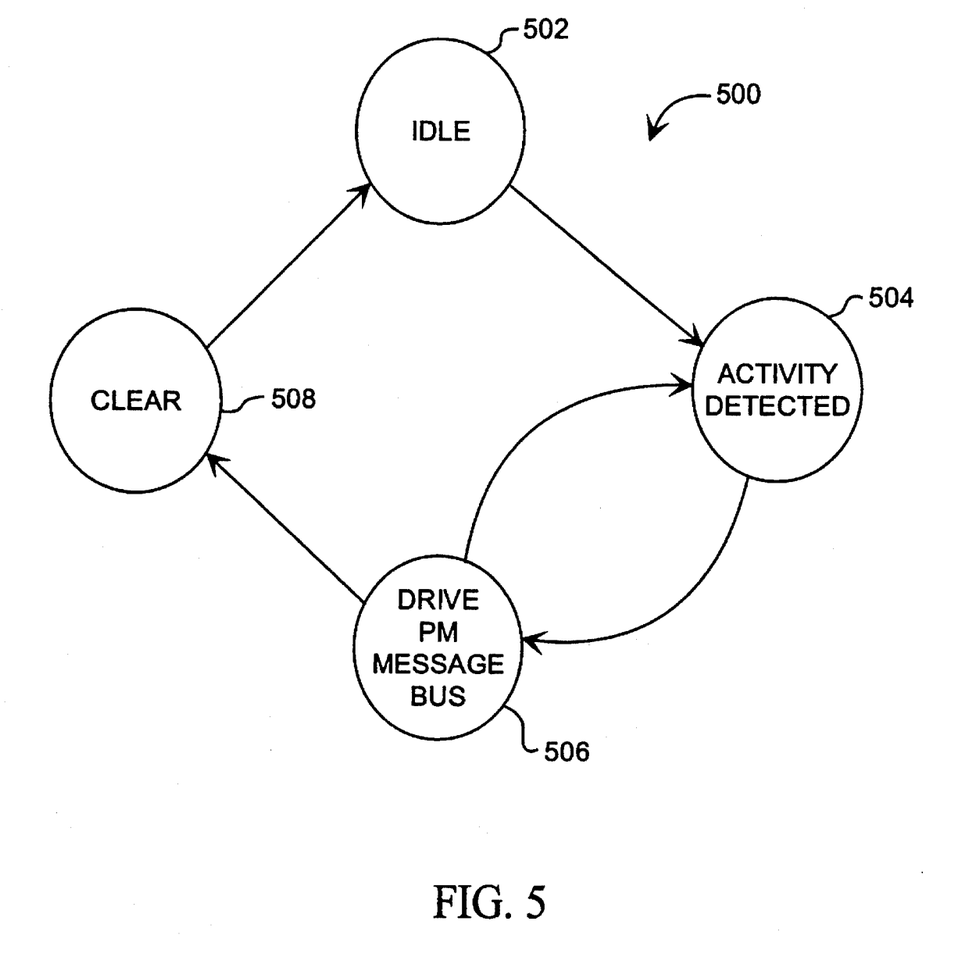
FIG. 5 is a diagram of an algorithmic state machine embodied within the power management message unit of FIG. 2.

FIG. 5 is a diagram of an algorithmic state machine 500 embodied within message transmit logic unit 308. State machine 500 enters a idle state 502 upon system reset, and transitions to state 504 when a monitored activity is detected by either bus request detector 302, NPU monitor 304, or interrupt detector 306. The type of detected activity is determined during state 504. State machine 500 next transitions to state 506 during which a valid message in accordance with the encoded values of Table I is driven on lines PMCODE [2:0] of the power management message bus 210. The validation strobe PMVALID# is further asserted during state 506. If additional activity is detected during state 506, state machine 500 transitions back to state 504, determines the type of activity detected, and reverts back to state 506 and drives the power management message bus 210 accordingly. When all interrupts have been cleared and all bus requests have been deasserted, the state machine 500 enters state 508 during which an encoded "All Clear" message is broadcast on the power management message bus 210. The validation strobe PMVALID# is again asserted during state 508 when the all clear message is asserted on lines PMCODE [2:0]. Following the all clear message, state machine 500 reverts back to idle state 502.

Referring back to FIG. 2, details regarding power management unit 208 will next be described. Power management unit 208 includes a power management state machine 260 coupled to an address snooping decoder 262, a clock control unit 264, a power control unit 266, and a time-out counters unit 268. A configuration registers unit 270 is further coupled to power management state machine 260, and a decoder 272 is coupled to configuration registers unit 270.

Figure 6:
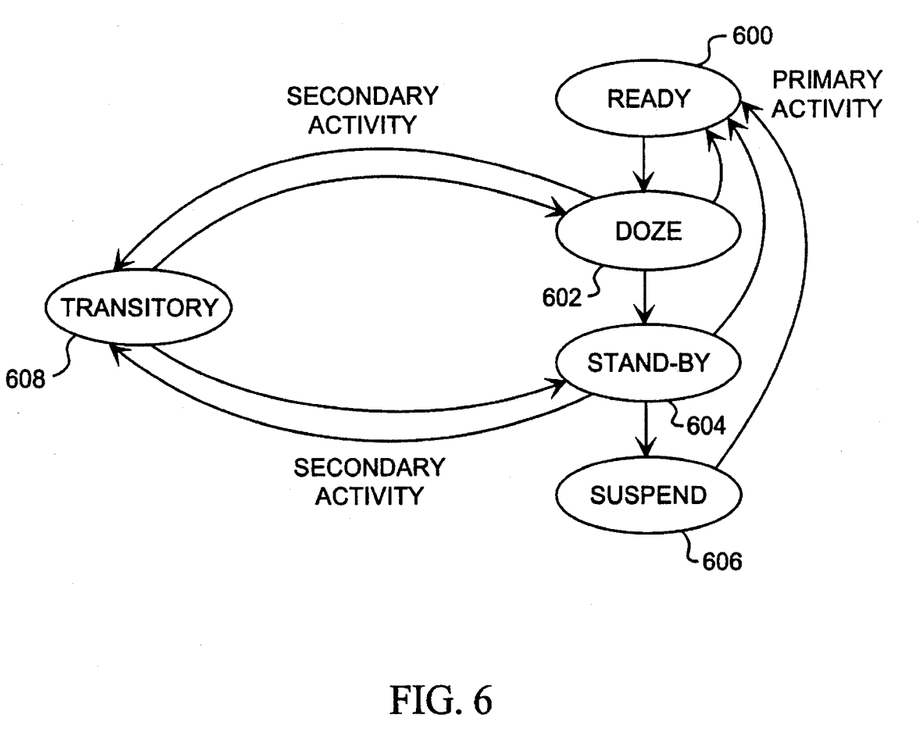
FIG. 6 is a diagram of an algorithmic state machine embodied within the power management unit of FIG. 2.

Power control unit 266 and clock control unit 264 respectively control the application and removal of power to and from selected portions of computer system 200, and the frequencies of the CPU and system clock signals, depending upon the internal state of power management state machine 260. FIG. 6 is a state diagram that illustrates several internal states of power management state machine 260. Specifically, power management state machine 260 includes a ready state 600, a doze state 602, a stand-by state 604, a suspend state 606, and a transitory state 608. During ready state 600, computer system 200 is considered full-on; that is, all components of the computer system 200 are clocked at full speed and are powered-on. The power management state machine 260 enters the ready state 600 upon power-up of the computer system and upon reset. The power management state machine 600 also enters the ready state 200 when a primary system activity is detected or when an internal state register (not shown) of configuration registers unit 270 is written with a "ready state" value via software writing through external bus 206. The classification of certain activities as "primary" activities is described further below.

Power management state machine 260 transitions from the ready state 600 to the doze state 602 if a primary activity is not detected during the entire duration of a first time-out period (0.125 seconds to 16 seconds) as determined by a first time-out counter within time-out counters unit 268. The power management state machine 260 can alternatively enter doze state 602 via software writing of a "doze state" value into the state register of configuration registers unit 270. During doze state 602, clock control unit 264 controls clock generator 230 such that the CPU clock signal is slowed down to a preprogrammed frequency. It is noted that during doze state 602, the system clock signal continues to be driven at its maximum relative frequency, and all components are powered-on.

The power management state machine 260 transitions from the doze state 602 to the stand-by state 604 if the system is idle for the entire duration of a second time-out period (1 minute to 16 minutes) without any primary activities occurring, as determined by a second time-out counter within time-out counters unit 268. The power management state machine 260 can alternatively enter the stand-by state 604 via software writing to the state register of configuration registers unit 270. During the stand-by state 604, power control unit 266 may cause the power to be removed from selected circuit portions, such as peripheral device 204. In addition, during stand-by state 604, clock control unit 264 causes the clock generator 230 to turn-off the CPU clock signal. The system clock signal continues to be driven at its maximum relative frequency.

The power management state machine 260 transitions to the suspend state 606 from the stand-by state 604 if the system is idle for the entire duration of a third time-out period (5 minutes to 60 minutes) without any primary activities occurring, as determined by a third time-out counter within time-out counters unit 268. Power management state machine 260 may alternatively enter the suspend state 606 via software writing of a "suspend state" value into the state register of configuration registers unit 270. When power management state machine 260 is in the suspend state 606, power control unit 266 may cause the power to be removed from selected circuit portion, such as peripheral device 244, and clock control unit 264 causes clock generator 230 to stop both the CPU clock signal and the system clock signal. Depending upon the system, the power control unit 252 may further cause power to be removed from additional circuit portions.

Power management state machine 260 enters the transitory state 608 from either the doze state 602 or stand-by state 604 if a secondary activity is detected, as will be described in greater detail below. Depending upon the detected secondary activity, the power management state machine 260 remains in the transitory state 608 for a predetermined time following detection of the secondary activity or for a predetermined amount of time following completion of the secondary activity. During transitory state 608, power management state machine 260 causes clock control unit 264 to control clock generator 230 such that the CPU clock signal and the system clock signal are driven at their maximum relative frequencies. Power is further applied to all circuit portions. Following the predetermined amount of time, power management state machine 260 reverts back to the previous state (i.e., doze state 602 or stand-by state 604).

Power management unit state machine 260 latches each message transmitted by power management message unit 232 upon the assertion of the validation strobe PMVALID#. When power management state machine 260 receives a new message, it determines whether a primary or a secondary activity has been detected. Table II below summarizes the type of activities detected within computer system 200 as well as the classification of each activity and the detection source. It is noted that in addition to the messages received via power management bus 210, other system activities are detected by snooping the external bus 206. Address snooping decoder 262 performs this snooping function and provides an indication of various detected activities to power management state machine 260. It is further noted that the classification of certain detected activities may be programmable via software; that is, certain activities as indicated below may be treated as either primary activities or secondary activities by the power management state machine 260, depending upon the programmers requirements. The classification of these activities is programmed by writing to selected configuration registers within configuration registers unit 270.

TABLE II

| Activity Name | Classification | Source |
| --- | --- | --- |
| NPU Active | Primary Activity | PM Message |
| SMI Active/Clear | Secondary Activity | PM Message |
| Int Active/Clear | Secondary Activity | PM Message |
| Timer Active/Clear | Secondary Activity | PM Message |
| NMI | Programmable Activity | PM Message |
| Bus Request/Clear | Programmable Activity | PM Message |
| Parallel Port Activity | Primary Activity | Address Snooping |
| Serial Port Activity | Primary Activity | Address Snooping |
| Hard Disk Activity | Primary Activity | Address Snooping |
| FDC Activity | Primary Activity | Address Snooping |
| Memory Cycles | Programmable Activity | Address Snooping |
| Video Activity | Programmable Activity | Address Snooping |
| Keyboard Activity | Programmable Activity | Address Snooping |

From Table II, it is noted that power management state machine 260 classifies activities of a floating-point coprocessing unit, parallel port activities, serial port activities, floppy disk activities, and hard disk activities as primary activities. The power management unit classifies system management interrupt (SMI) activities, interrupt activities, and timer activities as secondary activities. Non-maskable interrupt activities, bus request activities, memory cycles, video activity, and keyboard activity are each programmable activities and, as such, may be classified as either primary or secondary.

System management interrupt activities and interrupt activities are secondary activities that cause the system to enter transitory state 608. However, a transitory counter that determines the duration of time during which the system remains in the transitory state 608 does not start counting until after a corresponding clear message has been received from power management message bus 210. When the corresponding clear message is received, the transitory counter begins counting for a predetermined time period and, upon completion, causes the power management state machine 260 to revert back to its original state. Bus request activities are treated similarly if such are programmed as secondary activities. It is noted that the transitory counter referred to above is embodied as an integral part of power management state machine 260. It is further noted that the count period as controlled by the transitory counter may be programmable via a configuration register of configuration registers unit 270.

Timer tick activities, on the other hand, may cause the transitory counter to begin counting immediately upon entrance of transitory state 608. In one embodiment, the occurrence of a timer tick causes the transitory timer to begin counting for a 120 used duration. When this duration expires, the power management state machine reverts back to the original state from transitory state 608. It is noted that this special treatment of timer ticks may be programmable by the programmer, and that in one mode, timer ticks may be treated in the same manner described above with respect to system management interrupt activities and interrupt activities.

Decoder 272 is provided for decoding I/O write cycles executed on external bus 206 by, for example, integrated processor 202, and to allow software writing of configuration data into the various internal registers of configuration registers unit 270. It is noted that the time-out count periods associated with time-out counters unit 268 may be programmable via certain registers of configuration registers unit 270. It is further noted that the predetermined amount of time during which power management state machine 260 remains in the transitory state 608 may also be programmable.

Figure 7:
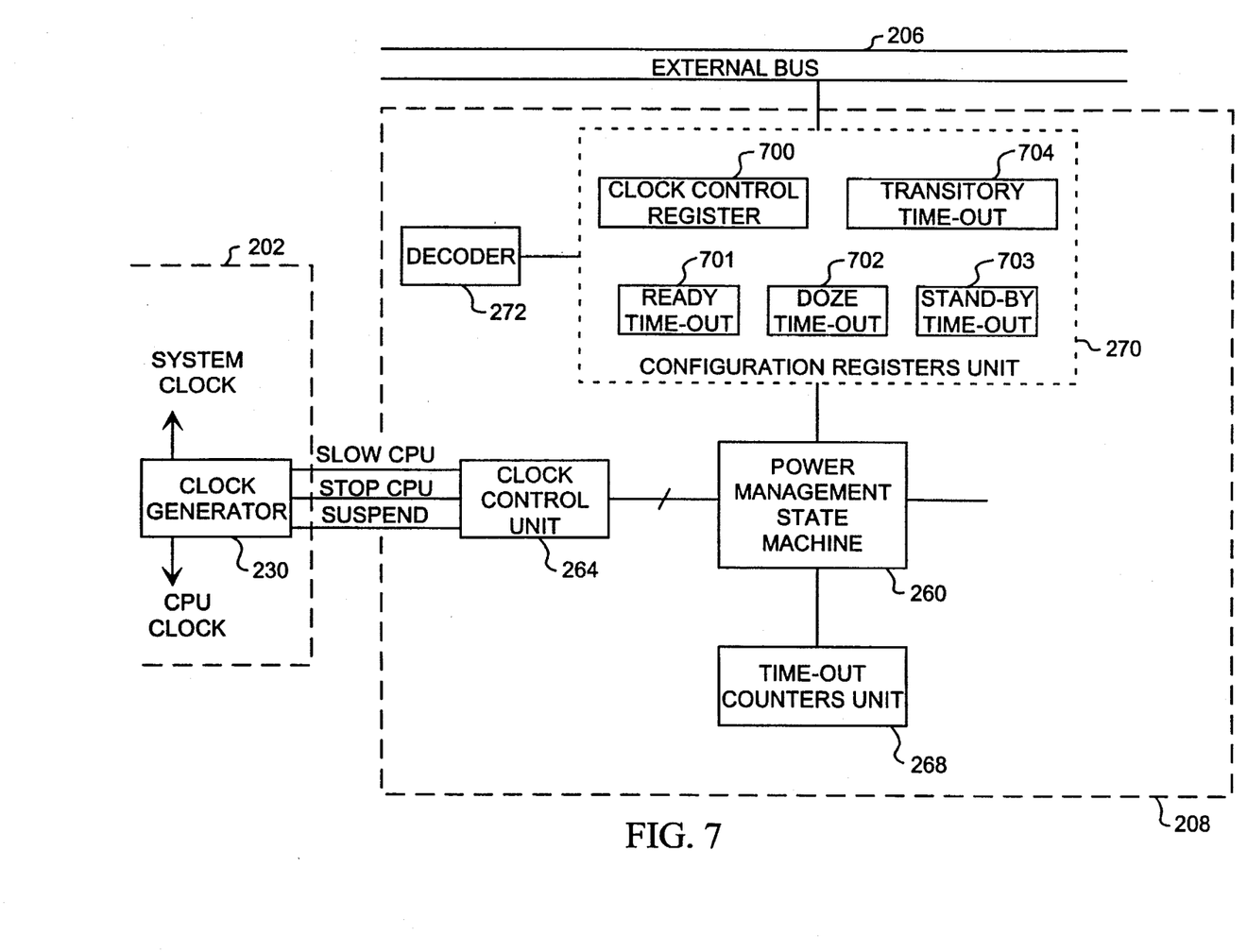
FIG. 7 is a block diagram that illustrates details of a power management unit.

FIG. 7 is a block diagram that illustrates details associated with one implementation of a power management unit 208 which operates in accordance with the above description and which conforms generally to the block diagram of FIG. 1. Circuit portions that correspond to those of FIG. 1 are numbered identically. It is noted that various portions of integrated processor 202 and power management unit 208 have been omitted from the drawing for simplicity and clarity.

For the implementation of FIG. 7, the clock control unit 264 generates a set of control signals individually labelled "SlowCPU", "Stop CPU", and "Suspend". When the SlowCPU signal is asserted, the clock generator 230 causes the frequency of the CPU clock signal to be reduced (relative to a maximum frequency). When the StopCPU signal is asserted, the clock generator stops the CPU clock signal. Finally, when the Suspend signal is asserted, the clock generator stops both the CPU clock signal and the system clock signal.

Assertions of the SlowCPU signal, the StopCPU signal and the Suspend signal are dependent upon the current state (i.e., ready, doze, stand-by, suspend, or transitory) of power management state machine 260. The configuration registers unit 270 includes a clock control register 700 which stores a configuration value that controls which signal, if any, is asserted during a given state. In one embodiment, clock control unit is configured such that none of the clock control signals (SlowCPU, StopCPU, and Suspend) are asserted when the power management state machine 260 is in either the ready state 600 or in the transitory state 608. The Suspend signal is asserted by clock control unit 264 if the power management state machine 260 is in the suspend state 608. Depending upon the configuration value stored within clock control register 700, the clock control unit 264 either asserts the SlowCPU signal or the StopCPU signal (or neither) when the power management state machine 260 is in the doze state 602. Similarly, also depending upon the configuration value stored within clock control register 700, the clock control unit 264 either asserts the SlowCPU signal or the StopCPU signal (or neither) when the power management state machine 260 is in the stand-by state 604. As a result, the specific control of the CPU clock signal and the system clock signal during the doze state 602 and the stand-by state 604 may be programmed by the user.

The configuration registers unit 270 of FIG. 7 is further illustrated with a ready time-out register 701, a doze time-out register 702, and a stand-by time-out register 703. These registers are employed to store configuration values to allow a programmer to set the ready time-out period, the doze time-out period, and the stand-by time-out period as controlled by time-out counters unit 268. The configuration registers unit 270 is finally depicted with a transitory time-out register 704 that allows a programmer to vary the time-out periods controlled by the transitory counter of power management state machine 260.

It is noted that interrupt controller 224 may be implemented in accordance with the interrupt controller disclosed within the co-pending, commonly assigned patent application entitled "Interrupt Controller With In-Service Indication"; by MacDonald et al.; Ser. No. 08/125,336; filed Sep. 22, 1993. This patent application is incorporated herein by reference in its entirety.

It is similarly noted that while the power management message unit 232 of FIG. 2 detects the specific activities as indicated within Table I, other internal system activities may be alternatively or additionally detected and indicated via power management message bus 210. For example, the power management message unit may be configured with a decoder to snoop the internal bus 260 to detect the execution of selected bus cycles. Furthermore, other sources for detecting selected system activities may also be employed. In addition, while the power management unit 208 of FIG. 2 controls the generation of various clock signals within computer system 200 as well as the application of power to various peripheral devices and subunits of computer system 200, the power management unit 208 may be configured to control only selected clock signals of computer system 200 or to control only the application of power to various peripheral devices.

The power management system described above may further be employed within a system including the circuitry and techniques described within the copending, commonly assigned patent applications: "Power Management Unit Including Software Configurable State Register and Time-Out Counters for Protecting Against Misbehaved Software", by O'Brien, et al., Ser. No. 08/190,279, filed Feb. 2, 1994; "Periodic System Management Interrupt Source and Power Management System Employing the Same", by Wisor, et al., Ser. No. 08/190,597, filed Feb. 2, 1994; "Immediate System Management Interrupt Source with Associated Reason Register" by Wisor, et al, Ser. No. 08/190,285, filed Feb. 2, 1994; "High Performance Integrated Processor Architecture", by Gephardt, et al., Ser. No. 08/190,647, filed Feb. 2, 1994; and "Power Management Unit Including A Programmable Index Register For Accessing Configuration Registers", by Wisor et al., Ser. No. 08/223,770, filed concurrently herewith. It is further noted that interrupt controller 224 may be implemented in accordance with the copending, commonly assigned patent application entitled "Interrupt Controller With In-Service Indication", by MacDonald et al., Ser. No. 08/125,336, filed Sep. 22, 1993. The above copending, commonly assigned patent applications are incorporated herein by reference in their entirety.

It is finally noted that when the power management state machine is in suspend state 606, the application of power to the system oscillator may be removed to promote further power reduction. Power management unit 208 may employ the circuitry and techniques taught within the copending, commonly assigned patent application "System Oscillator Gating Technique For Power Management Within A Computer System" by O'Brien et al., Ser. No. 08/160,931, filed Dec. 1, 1993, to effectuate the gating of the system oscillator during the suspend state. The above patent application is incorporated herein by reference in its entirety.

Numerous variations and modifications will become apparent to those skilled in the art once the above disclosure is fully appreciated. For example, external bus 206 may be coupled to integrated processor 202 directly or through a bus bridge. It is intended that the following claims be interpreted to embrace all such variations and modifications.

What is claimed is:

1. A computer system comprising:
   an integrated processor including a CPU core, a power management message unit coupled to said CPU core, and a clock generator coupled to said CPU core, wherein said power management message unit is configured to detect a predetermined number of differing types of internal activities of said integrated processor and to generate an encoded signal including a plurality of bits for conveying a binary value, wherein an occurrence of each of said differing types of internal activities is separately represented by a differing binary value of said encoded signal, and wherein a total number of said plurality of bits of said encoded signal is less than said predetermined number of differing types of internal activities, and wherein said encoded signal is provided to an external set of terminals;
   a power management message bus coupled to said external set of terminals for transferring said encoded signal; and
   a power management unit coupled to said power management message bus for managing power within said computer system, wherein said power management unit is fabricated on an integrated circuit chip which is separate from said integrated processor, and wherein said power management unit includes a clock control unit capable of controlling said clock generator in response to said encoded signal.

2. The computer system as recited in claim 1 wherein said clock control unit controls a frequency of a clock signal generated by said clock generator depending upon said encoded signal.

3. The computer system as recited in claim 1 wherein said power management unit further includes a power control unit for controlling an application of power to at least one external peripheral device.

4. A computer system as recited in claim 3 wherein said power control unit controls said application of power depending upon said encoded signal.

5. The computer system as recited in claim 1 wherein a first binary value of said encoded signal indicates that an interrupt service routine is in progress.

6. The computer system as recited in claim 5 wherein a second binary value of said encoded signal indicates that a timer interrupt is pending.

7. The computer system as recited in claim 5 wherein a second binary value of said encoded signal indicates activity of a coprocessor.

8. The computer system as recited in claim 5 wherein a second binary value of said encoded signal indicates bus activity of a DMA controller.

9. The computer system as recited in claim 5 wherein a second binary value of said encoded signal indicates an occurrence of a non-maskable interrupt.

10. The computer system as recited in claim 1 wherein said encoded signal includes at least two bits, wherein at least three differing types of internal activities are represented with differing binary values of said at least two bits.

11. The computer system as recited in claim 1 wherein said encoded signal includes at least two bits, wherein said at least two bits can convey at least a first binary value, a second binary value, and third binary value, and wherein a first predetermined type of internal activity is represented by said first binary value, wherein a second predetermined type of internal activity is represented by said second binary value, and a third predetermined type of internal activity is represented by said third binary value.

12. The computer system as recited in claim 1 wherein said power management message unit is further configured to assert a validation strobe to indicate that a valid encoded signal is being conveyed on said power management message bus.

13. A method for managing power within a computer system, wherein said computer system includes an integrated processor having a CPU core and at least one on-chip peripheral device, said method comprising the steps of:

monitoring a plurality of differing types of internal activities of said integrated processor;

representing each one of said plurality of differing types of internal activities with a unique encoded value having a number of bits which is less than a total number of said plurality of differing types of internal activities:

generating an encoded signal that conveys said unique encoded value to indicate an occurrence of one of said plurality of differing types of internal activities;

providing said encoded signal on an external dedicated bus coupled to said integrated processor;

receiving said encoded signal at an external power management unit from said external dedicated bus; and providing a clock control signal from said external power management unit to said integrated processor to control generation of a CPU clock signal depending upon said encoded signal.

14. The method for managing power within a computer system as recited in claim 13 comprising the further step of varying the frequency of said CPU clock signal in response to said encoded signal.

15. The method for managing power within a computer system as recited in claim 13 comprising the further step of generating a validation strobe simultaneously with said step of providing said encoded signal on said external dedicated bus, wherein said validation strobe indicates that a valid encoded signal is being conveyed on said external dedicated bus.

16. The method for managing power within a computer system as recited in claim 13 comprising the further step of generating a power control signal within said external power management unit to control an application of power to an external peripheral device depending upon said encoded signal.

17. The method for managing power within a computer system as recited in claim 13 wherein said step of monitoring includes the step of detecting an assertion of an interrupt signal from a system resource.

* * * * *